US012747772B2

(12) United States Patent
Gil Gonzalez

(10) Patent No.: US 12,747,772 B2
(45) Date of Patent: Sep. 29, 2026

(54) ROPE SECURING DEVICE AND ASSOCIATED METHOD OF SECURING A ROPE

(71) Applicant: Honeywell Safety Products USA, Inc., Charlotte, NC (US)

(72) Inventor: Ronald Giovany Gil Gonzalez, Zapopan Jal (MX)

(73) Assignee: PIP Manufacturing, Inc., Latham, NY (US)

( * ) Notice: Subject to any disclaimer, the term of this patent is extended or adjusted under 35 U.S.C. 154(b) by 0 days.

(21) Appl. No.: 19/079,233

(22) Filed: Mar. 13, 2025

(65) Prior Publication Data

US 2026/0276058 A1 Sep. 17, 2026

(51) Int. Cl.
*F16G 11/04* (2006.01)

(52) U.S. Cl.
CPC .................................... *F16G 11/04* (2013.01)

(58) Field of Classification Search
CPC ........................................................ F16G 11/04
See application file for complete search history.

(56) References Cited

U.S. PATENT DOCUMENTS 933,685 A 9/1909 Heber
1,486,507 A * 3/1924 Walker .................... D06F 53/04 24/134 P
2,066,049 A * 12/1936 Passek .................... D06F 53/04 24/136 R
2,084,265 A * 6/1937 Dzierzenga ............. E06B 9/324 24/132 R
3,198,290 A * 8/1965 Di Maio ................. B63B 21/08 188/65.1
3,389,765 A * 6/1968 Pressley, Sr. ........... B63B 21/08 182/5
4,337,553 A * 7/1982 Fischer .................... H01Q 1/16 24/115 H
4,830,340 A * 5/1989 Knitig ................... F16G 11/108 24/115 L (Continued)

FOREIGN PATENT DOCUMENTS

CN 111603693 A 9/2020
FR 2410482 A1 6/1979
WO 9213601 A1 8/1992

OTHER PUBLICATIONS

International Searching Authority, "International Search Report and Written Opinion" , From Application No. PCT/US2026/018750, Mailed Jul. 1, 2026, pp. 16.

*Primary Examiner* — David M Upchurch
(74) *Attorney, Agent, or Firm* — Fredrikson & Byron, P.A.

(57) ABSTRACT

A rope securing device is provided. For example, a rope securing device comprises a body defining (i) a chamber, (ii) a first end opening, (iii) a second end opening, and (iv) a top opening, a first roller, and a second roller. A first rope portion of the chamber defines a first rope path. A second rope portion of the chamber defines a second rope path. A center rope portion of the chamber defines a rope loop path. The first and second rollers are adapted to apply a securing force against a rope when the first and second rollers are slidably moved within a respective roller portion of the chamber to their respective inferior medial positions to secure a loop of the rope that is projecting out of the top opening.

20 Claims, 4 Drawing Sheets

(56) References Cited

U.S. PATENT DOCUMENTS

| | | | | | |
|---|---|---|---|---|---|
| 5,423,108 | A * | 6/1995 | Brennan | F16G 11/143 | |
| | | | | 24/298 | |
| 5,921,353 | A * | 7/1999 | Day | B66C 1/12 | |
| | | | | 188/65.3 | |
| 7,159,638 | B2 * | 1/2007 | Hsu | E06B 9/324 | |
| | | | | 24/115 L | |
| 7,250,021 | B2 * | 7/2007 | Leight | A63B 21/025 | |
| | | | | 482/126 | |
| 7,337,504 | B1 * | 3/2008 | Casey | B63B 21/08 | |
| | | | | 24/134 P | |
| 9,611,875 | B2 * | 4/2017 | Likosar | A63C 11/02 | |
| 11,359,695 | B2 * | 6/2022 | Janssens | F16G 11/106 | |
| 12,449,066 | B2 * | 10/2025 | Schimpf | F16L 3/01 | |
| 2002/0117353 | A1 | 8/2002 | Jones | | |
| 2007/0137003 | A1 * | 6/2007 | Zebe | A43C 7/04 | |
| | | | | 24/134 P | |
| 2012/0049020 | A1 * | 3/2012 | Stock | B25H 3/04 | |
| | | | | 248/316.5 | |
| 2019/0314650 | A1 * | 10/2019 | Cowell | A63B 27/00 | |

* cited by examiner

ROPE SECURING DEVICE AND ASSOCIATED METHOD OF SECURING A ROPE

FIELD OF THE INVENTION

Embodiments of the present disclosure generally relate to fall protection systems, and, more particularly, to anchorage points for travel restraint systems.

BACKGROUND

Working on elevated surfaces, such as industrial sized HVAC (heating, ventilation, air conditioning) chillers, can be dangerous. According to safety regulations, workers on such elevated surfaces must use a fall protection system or a travel restraint system when possible. Such safety systems typically comprise a harness worn by the worker. The harness is attached to an anchorage point using a connecting device (such as a lanyard, rope, cable, self-retracting device, etc.). The anchorage point is typically attached to a restraint line with a horizontal portion that spans the elevated surface (the restraint line may wrap around the entire structure).

In use, it is important for the connecting device to be easily and securely attachable to the anchorage point and for the anchorage point to be easily and securely attachable to the restraint line. Further, it is important for the anchorage point to be readily movable along the horizontal portion of the restraint line, to enable the worker to move and reach various areas of the elevated surface.

Existing anchorage points for horizontal restraint lines are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to rope securing devices and associated methods of securing a rope.

A rope securing device is provided. For example, a rope securing device comprises a body defining (i) a chamber within the body, (ii) a first end opening to the chamber in a first end surface of the body, (iii) a second end opening to the chamber in a second end surface of the body opposite the first end surface, and (iv) a top opening in a top surface of the body; a first roller; and a second roller. The chamber comprises a first rope portion, a center rope portion, a second rope portion, a first roller portion, and a second roller portion. The first rope portion of the chamber defines a first rope path from the first end opening to the center rope portion of the chamber. The second rope portion of the chamber defines a second rope path from the center rope portion of the chamber to the second end opening. The center rope portion of the chamber defines a rope loop path adapted to enable a loop of rope to protrude through the top opening. The first roller portion of the chamber provides a path for the first roller to slidably move upward and away from a transverse plane of the rope securing device toward the first end surface and into a superior lateral position and to slidably move downward and toward the transverse plane of the rope securing device away from the first end surface and into an inferior medial position. The second roller portion of the chamber provides a path for the second roller to slidably move upward and away from the transverse plane of the rope securing device toward the second end surface of the rope securing device and into a superior lateral position and to slidably move downward and toward the transverse plane of the rope securing device away from the second end surface and into an inferior medial position. The first and second rollers are adapted to apply a securing force against a rope and to allow proper rope-sliding in the transverse plane if needed when the first and second rollers are in their respective inferior medial positions to secure a loop of the rope that is projecting out of the top opening.

In some embodiments, a floor of the chamber comprises a raised middle portion with opposing downwardly sloping side portions.

In some embodiments, the opposing downwardly sloping side portions of the floor of the chamber are curved.

In some embodiments, the raised middle portion of the floor of the chamber is peaked.

In some embodiments, the rope securing device further comprises a locking device to secure the first and second rollers in their respective inferior medial positions.

In some embodiments, the first roller defines a center through-hole and the second roller defines a center through-hole. The body further defines (i) a first front opening in a front surface of the body, (ii) a second front opening in the front surface of the body, (iii) a first rear opening in a rear surface of the body opposite the front surface, and (iv) a second first rear opening in the rear surface of the body. The first front opening in the body and the first rear opening in the body are aligned. The second front opening in the body and the second rear opening in the body are aligned. The first front opening in the body, the center through-hole of the first roller, and the first rear opening in the body are aligned when the first roller is in its inferior medial position. The second front opening in the body, the center through-hole of the second roller, and the second rear opening in the body are aligned when the second roller is in its inferior medial position.

In some embodiments, the rope securing device further comprises a first locking pin and a second locking pin. The first locking pin is selectively insertable through the first front opening in the body, the center through-hole of the first roller, and the first rear opening in the body when the first roller is in its inferior medial position. The second locking pin is selectively insertable through the second front opening in the body, the center through-hole of the second roller, and the second rear opening in the body when the second roller is in its inferior medial position.

In some embodiments, the first roller is selectively insertable into the first roller portion of the chamber and the second roller is selectively insertable into the second roller portion of the chamber.

In some embodiments, the body comprises first and second body portions selectively separable from each other to access the chamber.

In some embodiments, the first and second body portions are hingedly affixed to each other.

In some embodiments, the first and second body portions are mirror images of each other.

In some embodiments, the chamber, the first end opening, the second end opening, and the top opening are all symmetrical about a longitudinal plane of the rope securing device.

In accordance with various embodiments of the present disclosure, a method of securing a rope is provided. In some embodiments, the method comprises positioning a rope partially within a chamber defined within a body of a rope securing device such that (i) a first portion of the rope is within a first rope path defined by a first rope portion of the chamber and protrudes through a first end opening to the chamber defined in a first end surface of the body, (ii) a second portion of the rope is within a second rope path defined by a second rope portion of the chamber and protrudes through a second end opening to the chamber defined in a second end surface of the body, and (iii) a loop portion of the rope between the first and second portions of the rope is positioned partly within a rope loop path defined by a center rope portion of the chamber and partly protruding through a top opening in a top surface of the body; positioning a first roller within a first roller portion of the chamber, the first roller portion providing a path for the first roller to slidably move upward and away from a transverse plane of the rope securing device toward the first end surface and into a superior lateral position and to slidably move downward and toward the transverse plane of the rope securing device away from the first end surface and into an inferior medial position; positioning a second roller within a second roller portion of the chamber, the second roller portion providing a path for the second roller to slidably move upward and away from the transverse plane of the rope securing device toward the second end surface of the rope securing device and into a superior lateral position and to slidably move downward and toward the transverse plane of the rope securing device away from the second end surface and into an inferior medial position; and moving the first roller and the second roller into their respective inferior medial positions such that the first roller applies a securing force again a portion of the rope and the second roller applies a securing force again a different portion of the rope to secure the loop portion of the rope that is projecting out of the top opening.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
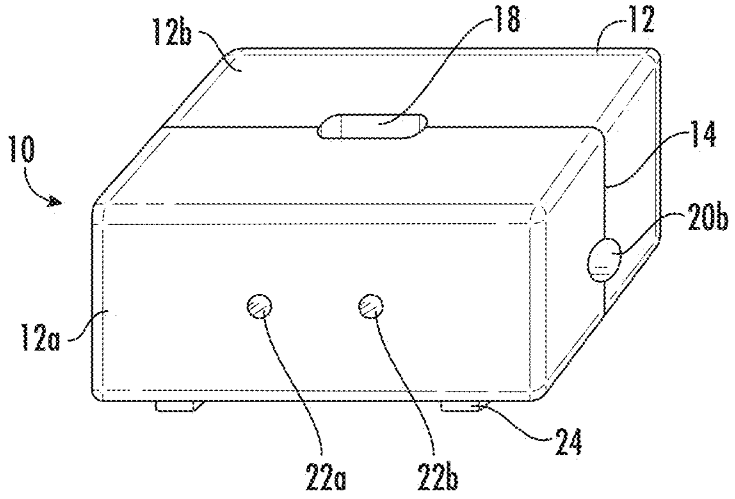
FIG. 1 is a perspective view of an example rope securing device, in a closed configuration, in accordance with example embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as “front,” “rear,” “top,” “bottom,” “left,” “right,” etc. are used for explanatory purposes in the examples provided below to describe the relative position of certain components or portions of components. Furthermore, as would be evident to one of ordinary skill in the art in light of the present disclosure, the terms “substantially” and “approximately” indicate that the referenced element or associated description is accurate to within applicable engineering tolerances.

As used herein, the term “comprising” means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases “in one embodiment,” “according to one embodiment,” “in some embodiments,” and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The phrases “in one example,” “according to one example,” “in some examples,” and the like generally mean that the particular feature, structure, or characteristic following the phrase may be included in at least one example of the present disclosure and may be included in more than one example of the present disclosure (importantly, such phrases do not necessarily refer to the same example).

If the specification states a component or feature “may,” “can,” “could,” “should,” “would,” “preferably,” “possibly,” “typically,” “optionally,” “for example,” “as an example,” “in some examples,” “often,” or “might” (or other such language) be included or have a characteristic, that specific component or feature is not required to be included or to have the characteristic. Such component or feature may be optionally included in some examples, or it may be excluded.

The word “example” or “exemplary” is used herein to mean “serving as an example, instance, or illustration.” Any implementation described herein as “example” or “exemplary” is not necessarily to be construed as preferred or advantageous over other implementations.

The term “electronically coupled,” “electronically coupling,” “electronically couple,” “in communication with,” “in electronic communication with,” or “connected” in the present disclosure refers to two or more elements or components being connected through wired means and/or wireless means, such that signals, electrical voltage/current, data and/or information may be transmitted to and/or received from these elements or components.

The term "component" may refer to an article, a device, or an apparatus that may comprise one or more surfaces, portions, layers and/or elements. For example, an example component may comprise one or more substrates that may provide underlying layer(s) for the component and may comprise one or more elements that may form part of and/or are disposed on top of the substrate. In the present disclosure, the term "element" may refer to an article, a device, or an apparatus that may provide one or more functionalities.

Various embodiments of the present disclosure overcome the above technical challenges and difficulties and provide various technical improvements and advantages. For example, various embodiments of the present disclosure provide an example rope securing device and an example method of securing a rope.

In various embodiments of the present disclosure, a rope securing device comprises a rope grab body. By entering a rope in the rope grab body and through the internal routing, the rope can be secured within the rope securing device with sliding rollers to provide a secure attachment point to which a user can securely attach. In various embodiments, the attachment point is created by a loop of the rope protruding from the rope securing device once the rope is routed in the rope grab body and locked between the sliding rollers locking pins. In various embodiments, a thimble or the like is positioned in the top, inner curve of the loop to help maintain the shape of the loop once created. A snap-hook, carabiner, or any sort of rigid or flexible connector the like can be used to attach one end of a connecting device to the loop, with the other end of the connecting device attached to the user's harness. The user can slide the loop to reposition the robe grab device if needed to move about the work surface and along the horizontal restraint lifeline.

Referring now to FIGS. 1-6, an example rope securing device is illustrated in accordance with example embodiments of the present disclosure. Such a rope securing device may also be termed a rope grab device or simply a rope grab. The rope securing device 10 of FIGS. 1-6 comprises a body 12 having a first body portion 12*a* and a second body portion 12*b*. In various embodiments, the body 12 may have any suitable shape, such as the generally rectangular prism shape illustrated in FIGS. 1 and 6. In various embodiments, as described further below, the body 12 defines a chamber for receiving part of a rope or the like that is serving as a restraint line or the like, such that the rope securing device 10 functions as an attachment device for a safety system. In various embodiments, the body 12 may be constructed of any suitable material, such as any suitable metal or other strong, rigid material. In various embodiments, a plurality of feet 24 (typically four) are positioned on a bottom surface of the rope securing device 10 to provide a stable footing for the rope securing device 10. In various embodiments, the feet 24 may be constructed of any suitable material.

In various embodiments, the first body portion 12*a* and the second body portion 12*b* are selectively separable (either partially separable (e.g., hingedly affixed to each other) or fully separable) to access the chamber for inserting part of the rope into the chamber. In the illustrated embodiment, the first body portion 12*a* and the second body portion 12*b* are equal size and mirror images of each other. A seam 14 is present when the first body portion 12*a* and the second body portion 12*b* are joined together. In the illustrated embodiment, a hinge 16 joins a lower, inner edge of the first body portion 12*a* and a lower, inner edge of the second body portion 12*b* such that the first body portion 12*a* and the second body portion 12*b* fold apart and together like a clamshell. In various other embodiments (not illustrated), the first body portion 12*a* and the second body portion 12*b* may be completely separable (i.e., not joined by a hinge). In various embodiments in which a hinge joins the first body portion 12*a* and the second body portion 12*b*, a locking device (not illustrated) may be used to lock the first body portion 12*a* and the second body portion 12*b* together during use. Such a locking device may, for example, be on a top surface of the rope securing device 10 to lock together an upper, inner edge of the first body portion 12*a* and an upper, inner edge of the second body portion 12*b*. Alternatively, such a locking device may, for example, be on one or both opposing end surfaces of the rope securing device 10. In various embodiments in which a hinge is not present and the first body portion 12*a* and the second body portion 12*b* are completely separable, two or more locking devices (not illustrated) may be used to lock the first body portion 12*a* and the second body portion 12*b* together during use. Such locking devices may, for example, be on a top surface of the rope securing device 10 and on a bottom surface of the rope securing device 10.

As illustrated, a chamber 26 is defined within the body. A first end opening 20*a* to the chamber 26 is defined in a first end surface of the body 12, a second end opening 20*b* to the chamber 26 is defined in a second end surface of the body 12 opposite the first end surface, and a top opening 18 to the chamber 26 is defined in a top surface of the body 12. A first front opening 22*a* to the chamber 26 is defined in a front surface of the body 12 and a second front opening 22*b* to the chamber 26 is defined in the front surface of the body 12. Identical first and second rear openings (not illustrated) to the chamber 26 are defined in a rear surface of the body 12. The first front opening 22*a* and the first rear opening are aligned, and the second front opening 22*b* and the second rear opening are aligned.

In various embodiments, the chamber 26 comprises a first rope portion 28*a*, a center rope portion 28*b*, and a second rope portion 28*c*. As illustrated, the first rope portion 28*a* of the chamber 26 defines a first rope path from the first end opening 20*a* to the center rope portion 28*b* of the chamber 26, the second rope portion 28*c* of the chamber 26 defines a second rope path from the center rope portion 28*b* of the chamber 26 to the second end opening 20*b*, and the center rope portion 28*b* of the chamber 26 defines a rope loop path adapted to position a loop of rope to protrude through the top opening 18.

Figure 2:
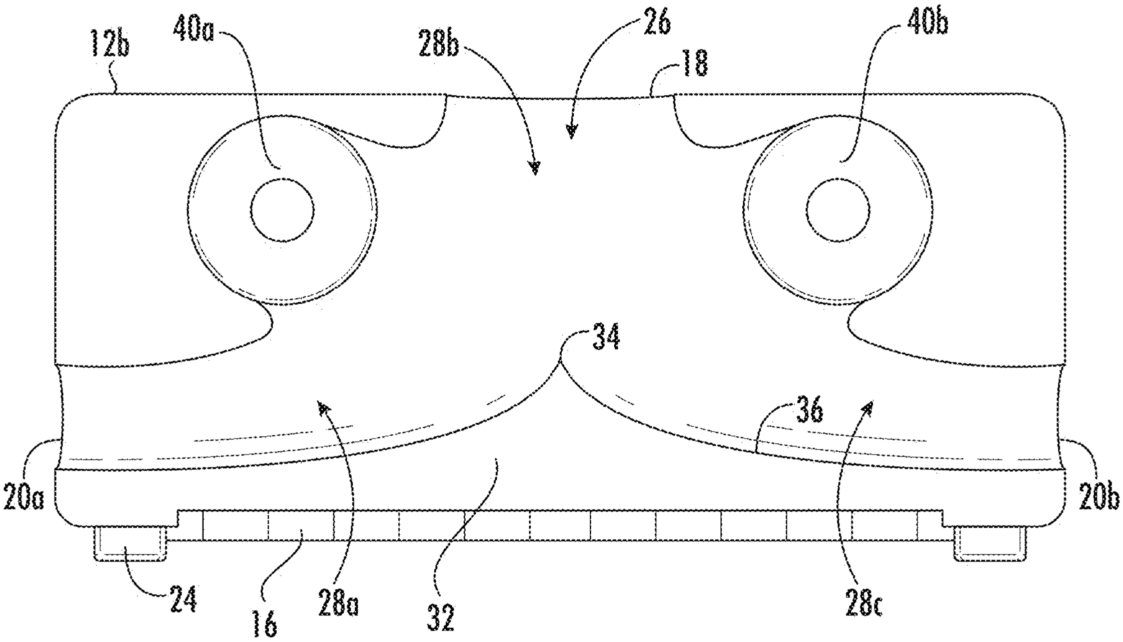
FIG. 2 is a side view of a portion of the example rope securing device of FIG. 1 in an open configuration, in accordance with example embodiments of the present disclosure.
Figure 3:
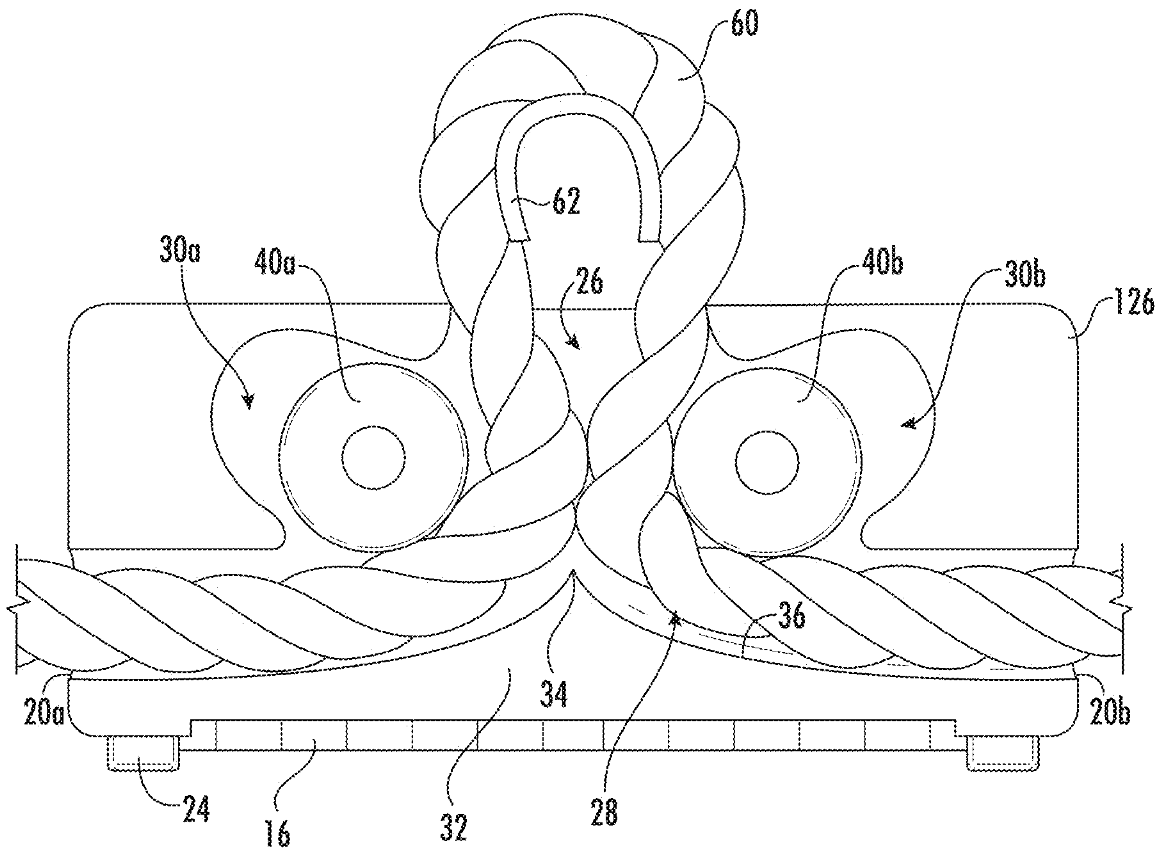
FIG. 3 is a side view a portion of the of the example rope securing device of FIG. 1 in an open configuration and a rope inserted.

In various embodiments, the chamber 26 further comprises a first roller portion 30*a* and a second roller portion 30*b*. In various embodiments, the first roller portion 30*a* of the chamber 26 provides a path for a first roller 40*a* to slidably move upward and away from the transverse plane of the rope securing device 10 into a superior lateral position as shown in FIG. 2 and for the first roller 40*a* to slidably move downward and toward the transverse plane of the rope securing device 10 into an inferior medial position as shown in FIG. 3. Similarly, the second roller portion 30*b* of the chamber 26 provides a path for a second roller 40*b* to slidably move upward and away from the transverse plane of the rope securing device 10 a superior lateral position as shown in FIG. 2 and for the second roller 40*b* to slidably move downward and toward the transverse plane of the rope securing device 10 into an inferior medial position as shown in FIG. 3.

In various embodiments, the first roller 40*a* and the second roller 40*b* apply a securing force against a rope when the first and second rollers are in their respective inferior medial positions to secure a loop of the rope that is projecting out of the top opening 18.

Figure 4:
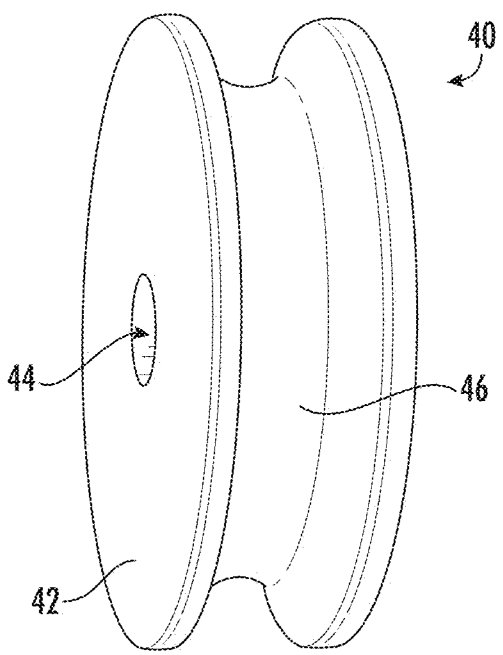
FIG. 4 is a perspective view of an example roller of an example rope securing device, in accordance with example embodiments of the present disclosure.

In various embodiments, the rollers, such as the first roller 40*a* illustrated in FIG. 4, comprise a generally cylindrical body 42 with a through-hole 44 to accept a locking pin (described below) and a circumferential groove 46 to accept a portion of the rope. While FIG. 4 illustrates only the first roller 40*a*, the second roller 40*b* is typically identical. In various embodiments, the rollers 40*a*, 40*b* are selectively removable from and insertable into the respective roller portions 30*a*, 30*b* of the chamber 26.

When the first body portion 12*a* and the second body portion 12*b* are joined together and the first roller 40*a* is in its inferior medial position (illustrated in FIG. 3), the first front opening 22*a* in the body 12, the center through-hole 44 of the first roller 40*a*, and the first rear opening in the body 12 are aligned. Similarly, when the first body portion 12*a* and the second body portion 12*b* are joined together and the second roller 40*b* is in its inferior medial position (illustrated in FIG. 3), the second front opening 22*b* in the body 12, the center through-hole of the second roller 40*b*, and the second rear opening in the body 12 are aligned. This alignment enables insertion of locking pins as described below.

Figure 5:
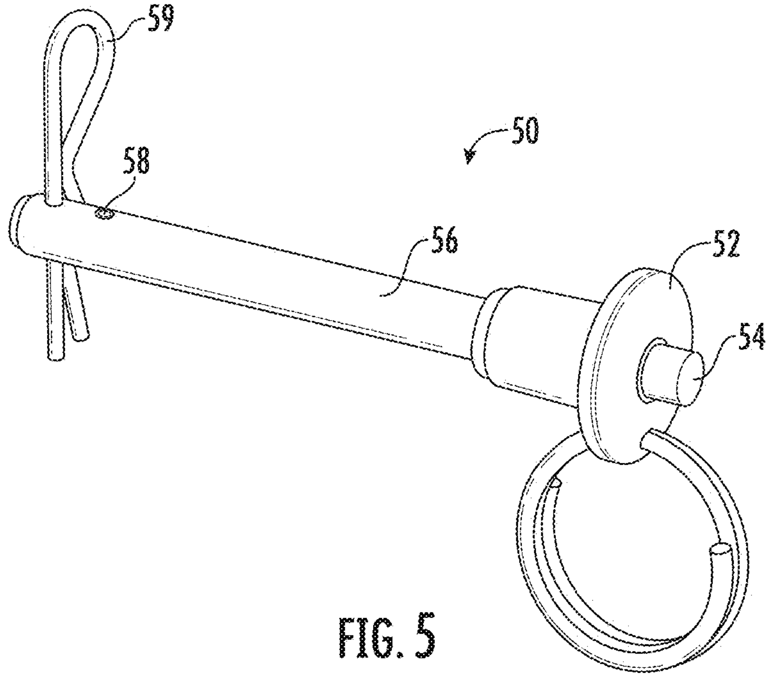
FIG. 5 is a perspective view of an example locking pin of an example rope securing device, in accordance with example embodiments of the present disclosure.
Figure 6:
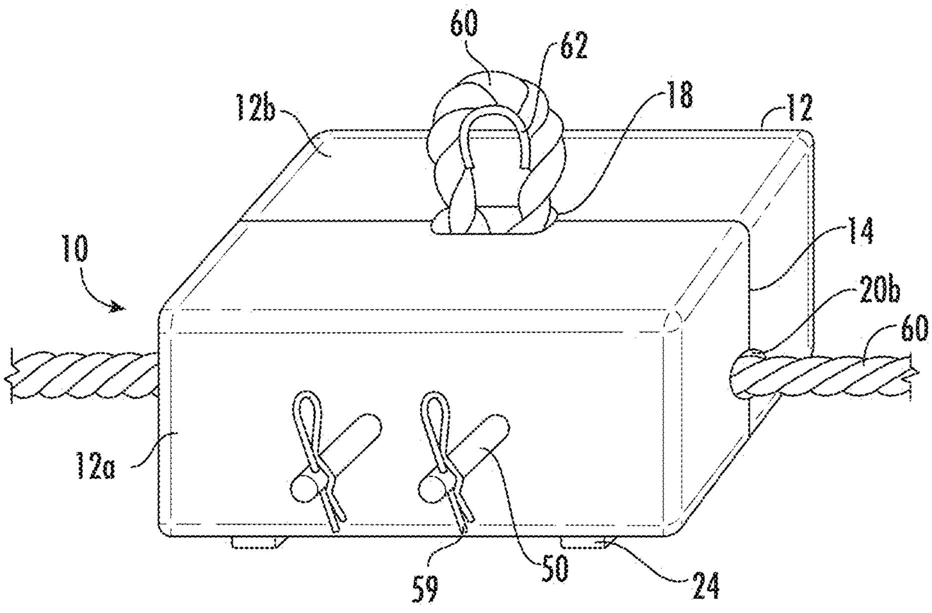
FIG. 6 is a perspective view of the example rope securing device of FIG. 1 in a closed and locked configuration and a rope inserted, in accordance with example embodiments of the present disclosure.

An example of such a locking pin is illustrated in FIG. 5. Such locking pins as in FIG. 5 are often termed positive locking pins. The locking pin 50 of FIG. 5 comprises an elongated shaft 56, a head 52, a button 54, and ball locks 58 that are retracted when the button 54 is pushed to enable insertion of the shaft 56. A through-hole (not visible) at the distal end of the shaft 56 enables insertion of a cotter pin 59 or the like to help retain the locking pin 50 in place. In alternative embodiments (not illustrated), locking pins may be used that are externally threaded and therefore threadably insertable into the body 12. In such alternative embodiments, the first and second front openings 22*a*, 22*b* and/or the first and second rear openings are internally threaded to threadably engage with the external threads of the locking pins.

In the illustrated embodiment in which the first body portion 12*a* and the second body portion 12*b* are equal size and mirror images of each other, the chamber 26 and its different portions are half defined by the first body portion 12*a* and half defined the second body portion 12*b* as mirror images. In various embodiments, the chamber, the first end opening, the second end opening, and the top opening are all symmetrical about a longitudinal plane and about a transverse plane of the rope securing device.

In various embodiments, a floor 32 of the chamber 26 comprises a raised middle portion 34 with opposing downwardly sloping side portions 36. In various embodiments, the shape pf the floor 32 of the chamber 26 helps position the rope to form the loop as well as providing a backstop to the force applied by the rollers 40*a*, 40*b* against the rope. In this regard, the floor 32 of the chamber 26 may be termed a rope-shaper. In the illustrated embodiment, the raised middle portion 34 is peaked or pointed, although in alternative embodiments the raised middle portion could be rounded. In the illustrated embodiment, the opposing downwardly sloping side portions 36 of the floor of the chamber are curved, although in alternative embodiments, the opposing downwardly sloping side portions could be straight (but still downwardly sloping).

To secure a rope securing device 10 to a restraint line (i.e., a rope laid horizontally), such as rope 60 of FIG. 3, to provide an attachment point for, e.g., a connecting device and harness, the rope securing device 10 is placed adjacent the restraint line at the desired location and the first body portion 12*a* and the second body portion 12*b* are separated to expose the chamber 26. A loop is formed within the restraint line where the rope securing device 10 is to be attached, and the rope 60 is positioned partially within the chamber 26 such that (i) a first portion of the rope 60 is within a first rope path defined by the first rope portion 28*a* of the chamber 26 and protrudes through the first end opening 20*a*, (ii) a second portion of the rope 60 is within a second rope path defined by the second rope portion 28*c* of the chamber 26 and protrudes through the second end opening 20*b*, and (iii) the loop portion of the rope 60 is positioned partly within a rope loop path defined by the center rope portion 28*b* of the chamber 26 and partly protruding through the top opening 18 in the top surface of the body. This placement of the rope 60 is illustrated in FIG. 3. To help hold the shape of the loop portion of the rope 60, an appropriately sized thimble 62 is placed on the inside of the loop portion as seen in FIG. 3.

Either before or after positioning the rope 60 partially within the chamber 26, the first roller 40*a* is positioned within the first roller portion 30*a* of the chamber 26 in its superior lateral position and the second roller 40*b* is positioned within the second roller portion 30*a* of the chamber 26 in its superior lateral position.

After the rollers 40*a*, 40*b* are positioned within their respective roller portion 30*a*, 30*b* and the rope 60 is partially positioned within the chamber 26 as described above, the first roller 40*a* is slid downward and toward the transverse plane of the rope securing device 10 into its inferior medial position and the second roller 40*b* is slid downward and toward the transverse plane of the rope securing device 10 into its inferior medial position. Moving the first roller 40*a* and the second roller 40*b* into their respective inferior medial positions causes the first roller 40*a* to apply a securing force again a portion of the rope 60 and the second roller 40*b* to apply a securing force again a different portion of the rope 60, thereby securing the loop portion of the rope 60 that is projecting out of the top opening 18.

The first body portion 12*a* and the second body portion 12*b* are then joined to close the chamber 26 and contain the portion of the rope 60 within the chamber. The shaft of a locking pin (such as locking pin 50 of FIG. 5) is inserted through the aligned first front opening 22*a*, center through-hole of the first roller 40*a*, and first rear opening, and the shaft of another locking pin is inserted through the aligned second front opening 22*b*, center through-hole of the second roller 40*b*, and second rear opening. A cotter pin or the like (such as the cotter pin 59 of FIG. 5) is inserted into the hole in each of the locking pins.

A connector such a carabiner of the like may now be attached to the loop of the rope 60 to secure a connecting device thereto, and thereby to secure a worker to the restraint line.

While the description above provides an example rope securing device 10, it is noted that the scope of the present disclosure is not limited to the description above. In some examples, an example rope securing device 10 in accordance with the present disclosure may be in other forms. In some examples, an example rope securing device 10 may comprise one or more additional and/or alternative elements, and/or may be structured differently than that illustrated in FIGS. 1-6.

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, which are protected thereby. In all instances, the scope of the claims shall be considered on their own merits in light of this disclosure but should not be constrained by the headings set forth herein.

Also, systems, subsystems, apparatuses, techniques, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatuses and systems described herein, various other components may be used in conjunction with the components and structures disclosed herein. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying drawings, and in some cases one or more of the steps depicted may occur substantially simultaneously, or additional steps may be involved. Although specific terms are employed herein, they are used in a generic and descriptive sense only and not for purposes of limitation.

What is claimed is:

1. A rope securing device comprising:

a body defining (i) a chamber within the body, (ii) a first end opening to the chamber in a first end surface of the body, (iii) a second end opening to the chamber in a second end surface of the body opposite the first end surface, and (iv) a top opening to the chamber in a top surface of the body;

a first roller; and a second roller;

wherein the chamber comprises a first rope portion, a center rope portion, a second rope portion, a first roller portion, and a second roller portion;

wherein the first rope portion of the chamber defines a first rope path from the first end opening to the center rope portion of the chamber;

wherein the second rope portion of the chamber defines a second rope path from the center rope portion of the chamber to the second end opening;

wherein the center rope portion of the chamber defines a rope loop path adapted to enable a loop of rope to protrude through the top opening;

wherein the first roller portion of the chamber provides a path for the first roller to slidably move upward and away from a transverse plane of the rope securing device toward the first end surface and into a superior lateral position and to slidably move downward and toward the transverse plane of the rope securing device away from the first end surface and into an inferior medial position;

wherein the second roller portion of the chamber provides a path for the second roller to slidably move upward and away from the transverse plane of the rope securing device toward the second end surface of the rope securing device and into a superior lateral position and to slidably move downward and toward the transverse plane of the rope securing device away from the second end surface and into an inferior medial position; and wherein the first and second rollers are adapted to apply a securing force against a rope when the first and second rollers are in their respective inferior medial positions to secure a loop of the rope that is projecting out of the top opening.

2. The rope securing device of claim 1, wherein a floor of the chamber comprises a raised middle portion with opposing downwardly sloping side portions.

3. The rope securing device of claim 2, wherein the opposing downwardly sloping side portions of the floor of the chamber are curved.

4. The rope securing device of claim 2, wherein the raised middle portion of the floor of the chamber is peaked.

5. The rope securing device of claim 1, further comprising a locking device to secure the first and second rollers in their respective inferior medial positions.

6. The rope securing device of claim 1, wherein the first roller defines a center through-hole;

wherein the second roller defines a center through-hole;

wherein the body further defines (i) a first front opening in a front surface of the body, (ii) a second front opening in the front surface of the body, (iii) a first rear opening in a rear surface of the body opposite the front surface, and (iv) a second first rear opening in the rear surface of the body;

wherein the first front opening in the body and the first rear opening in the body are aligned;

wherein the second front opening in the body and the second rear opening in the body are aligned;

wherein the first front opening in the body, the center through-hole of the first roller, and the first rear opening in the body are aligned when the first roller is in its inferior medial position; and wherein the second front opening in the body, the center through-hole of the second roller, and the second rear opening in the body are aligned when the second roller is in its inferior medial position.

7. The rope securing device of claim 6, further comprising a first locking pin and a second locking pin;

wherein the first locking pin is selectively insertable through the first front opening in the body, the center through-hole of the first roller, and the first rear opening in the body when the first roller is in its inferior medial position; and wherein the second locking pin is selectively insertable through the second front opening in the body, the center through-hole of the second roller, and the second rear opening in the body when the second roller is in its inferior medial position.

8. The rope securing device of claim 1, wherein the first roller is selectively insertable into the first roller portion of the chamber; and wherein the second roller is selectively insertable into the second roller portion of the chamber.

9. The rope securing device of claim 1, wherein the body comprises first and second body portions selectively separable from each other to access the chamber.

10. The rope securing device of claim 9, wherein the first and second body portions are hingedly affixed to each other.

11. The rope securing device of claim 9, wherein the first and second body portions are mirror images of each other.

12. The rope securing device of claim 1, wherein the chamber, the first end opening, the second end opening, and the top opening are all symmetrical about a longitudinal plane of the rope securing device.

13. A method of securing a rope, the method comprising:

positioning a rope partially within a chamber defined within a body of a rope securing device such that (i) a first portion of the rope is within a first rope path defined by a first rope portion of the chamber and protrudes through a first end opening to the chamber defined in a first end surface of the body, (ii) a second portion of the rope is within a second rope path defined by a second rope portion of the chamber and protrudes through a second end opening to the chamber defined in a second end surface of the body, and (iii) a loop portion of the rope between the first and second portions of the rope is positioned partly within a rope loop path defined by a center rope portion of the chamber and partly protruding through a top opening in a top surface of the body;

positioning a first roller within a first roller portion of the chamber, the first roller portion providing a path for the first roller to slidably move upward and away from a transverse plane of the rope securing device toward the first end surface and into a superior lateral position and to slidably move downward and toward the transverse plane of the rope securing device away from the first end surface and into an inferior medial position;

positioning a second roller within a second roller portion of the chamber, the second roller portion providing a path for the second roller to slidably move upward and away from the transverse plane of the rope securing device toward the second end surface of the rope securing device and into a superior lateral position and to slidably move downward and toward the transverse plane of the rope securing device away from the second end surface and into an inferior medial position; and moving the first roller and the second roller into their respective inferior medial positions such that the first roller applies a securing force again a portion of the rope and the second roller applies a securing force again a different portion of the rope to secure the loop portion of the rope that is projecting out of the top opening.

14. The method of claim 13, wherein a floor of the chamber comprises a raised middle portion with opposing downwardly sloping side portions.

15. The method of claim 14, wherein the opposing downwardly sloping side portions of the floor of the chamber are curved.

16. The method of claim 14, wherein the raised middle portion of the floor of the chamber is peaked.

17. The method of claim 13, wherein the first roller defines a center through-hole;

wherein the second roller defines a center through-hole;

wherein the body further defines (i) a first front opening in a front surface of the body, (ii) a second front opening in the front surface of the body, (iii) a first rear opening in a rear surface of the body opposite the front surface, and (iv) a second first rear opening in the rear surface of the body;

wherein the first front opening in the body and the first rear opening in the body are aligned;

wherein the second front opening in the body and the second rear opening in the body are aligned;

wherein the first front opening in the body, the center through-hole of the first roller, and the first rear opening in the body are aligned when the first roller is in its inferior medial position; and wherein the second front opening in the body, the center through-hole of the second roller, and the second rear opening in the body are aligned when the second roller is in its inferior medial position.

18. The method of claim 17, further comprising;

inserting a first locking pin through the first front opening in the body, the center through-hole of the first roller, and the first rear opening in the body when the first roller is in its inferior medial position; and inserting a second locking pin through the second front opening in the body, the center through-hole of the second roller, and the second rear opening in the body when the second roller is in its inferior medial position.

19. The method of claim 13, wherein the body comprises first and second body portions selectively separable from each other to access the chamber; and wherein the method further comprises:

separating the second body portion from the first body portion to access the chamber before positioning the rope partially within the chamber; and joining the first and second body portions back together after positioning the rope partially within the chamber.

20. The method of claim 19, wherein the first and second body portions are hingedly affixed to each other.

* * * * *